(12) United States Patent
Myron et al.

(10) Patent No.: US 6,222,191 B1
(45) Date of Patent: Apr. 24, 2001

(54) OCCUPANCY SENSOR

(75) Inventors: Douglas D. Myron; Vadim A. Konradi, both of Austin; R. Kurt Bender, Dripping Springs, all of TX (US)

(73) Assignee: Mytech Corporation, Austin, TX (US)

( * ) Notice: Subject to any disclaimer, the term of this patent is extended or adjusted under 35 U.S.C. 154(b) by 0 days.

(21) Appl. No.: 08/998,344

(22) Filed: Dec. 24, 1997

(51) Int. Cl.⁷ .................................................. G08B 13/18
(52) U.S. Cl. .................... 250/353; 250/340; 250/DIG. 1; 367/93; 340/541
(58) Field of Search ...................... 250/353, 340, 250/DIG. 1; 367/93; 340/541

(56) References Cited

U.S. PATENT DOCUMENTS

| | | |
|---|---|---|
| 3,958,118 | 5/1976 | Schwarz . |
| 4,383,288 | 5/1983 | Hess, II et al. . |
| 4,703,171 | 10/1987 | Kahl et al. . |
| 4,787,722 | 11/1988 | Claytor . |
| 5,015,994 | 5/1991 | Hoberman et al. . |
| 5,026,990 * | 6/1991 | Marman et al. ...................... 250/353 |
| 5,034,579 | 7/1991 | Rowland . |
| 5,083,025 | 1/1992 | Blomberg . |
| 5,124,546 | 6/1992 | Hu . |
| 5,128,654 | 7/1992 | Griffin et al. . |
| 5,142,199 | 8/1992 | Elwell . |
| 5,189,393 * | 2/1993 | Hu ........................................... 367/93 |
| 5,221,919 | 6/1993 | Hermans . |
| 5,258,899 | 11/1993 | Chen . |
| 5,281,961 | 1/1994 | Elwell . |
| 5,282,118 | 1/1994 | Lee . |
| 5,293,097 | 3/1994 | Elwell . |
| 5,311,024 * | 5/1994 | Marman et al. ...................... 250/353 |
| 5,386,210 | 1/1995 | Lee . |
| 5,586,048 | 12/1996 | Coveley . |
| 5,673,022 | 9/1997 | Patel . |
| 5,701,117 | 12/1997 | Platner et al. . |
| 5,818,337 * | 10/1998 | Erismann ............................. 250/340 |

OTHER PUBLICATIONS

*Automatic Light Switch News, Mytech,* Fall, 1995.
*Automatic Light Switch News, Mytech,* Spring, 1996.

* cited by examiner

Primary Examiner—Constantine Hannaher
Assistant Examiner—Andrew Isreal
(74) Attorney, Agent, or Firm—Fulbright & Jaworski, LLP (57) ABSTRACT

A multiple sensing technology-based occupancy sensor including a unique sensor case assembly and sensor mounting scheme. The result is an occupancy sensor that is adjustable to provide broader ultrasonic pattern coverage and an ability to focus infrared energy from a variety of directions. In addition, the unique mounting scheme permits simple and efficient installation of the occupancy sensor.

18 Claims, 8 Drawing Sheets

OCCUPANCY SENSOR

BACKGROUND OF THE INVENTION

The present invention relates to occupancy sensors.

An occupancy sensor is an energy conservation device designed to detect the presence of human occupant(s) in a given area. When occupancy is sensed, the various electrically-powered loads in that area controlled by the sensor (for example, lights, ventilation, and the like) are energized. When that same area has been unoccupied for a predetermined period of time, the sensor de-energizes the electrical loads that it controls. Occupancy sensors may therefore conserve a great deal of energy in areas where the occupants do not exercise diligence in de-energizing those electrical loads when they leave the area.

Over the last few decades, several events have led to the growth of a large consumer market for energy saving devices including occupancy sensors. First, there has been an increase in public awareness of energy conservation and its beneficial environmental consequences. In addition, there has been increased realization by both private and government-controlled power generation industries of the economic and environmental advantages of energy conservation as a means of meeting peak load power demands. Finally, there have been legislative mandates at the federal, state and local levels for the use of energy conserving devices, such as occupancy sensors, in government and other public buildings.

Significant innovation in the design of occupancy sensors has occurred over the last few decades. The early occupancy sensors utilized primarily analog signal processing techniques, and typically employed a single type of sensing technology, such as ultrasonic, passive infrared, pressure, microwave, photoelectric, or audible sound. These single technology occupancy sensors were subject to false tripping due to a variety of reasons. For example, ultrasonic Doppler sensors were subject to false trips due to air conditioning and heating system air flow. In addition, since these sensors had no means of range discrimination, they were subject to false trips due to motion outside the desired range of interest. Similarly, passive infrared (PIR) sensors were subject to being blinded by intense, stationary sources of infrared energy.

The next generation of occupancy sensors used two or more sensing technologies. These sensors typically required the user to specify a separate activation threshold for each detector technology in the sensor. The digital detector output of each sensor technology was then combined using classical digital logic to detect occupancy. In general, these multiple sensing technology sensors had better performance than their predecessors but still exhibited a sensitivity-false alarm tradeoff.

In general, prior art occupancy sensors heretofore known suffer from a number of disadvantages relating to the ability to use such sensors in different environments and different commercial applications. In particular, these sensors suffer from the inability to provide broad coverage of large areas without resorting to multiple sensors pointing in multiple directions, the lack of a simple installation and removal mounting scheme, and the inability to selectively mask a sensor to accommodate different operating environments while maintaining simple installation and adjustment.

SUMMARY OF THE INVENTION

The present invention avoids the above-noted failings of the prior art by providing a dual technology occupancy sensor that is easily mountable and configurable in order to permit a single occupancy sensor to be applied to many different environments.

Specifically, the present invention provides an occupancy sensor with a passive infrared (PIR) sensor. The occupancy sensor includes a passive infrared lens to focus infrared energy from a plurality of directions. A versatile PIR sensor masking scheme is provided that permits easy customization of the PIR sensor sensitivity pattern (i.e., the infrared energy passed by the PIR lens to the PIR sensor). Specifically, the masks of the present invention include an oblong pattern mask, an 180 degree mask, a 270 degree mask, and a 360 degree (complete) mask. In addition, each mask may be rotated, for example, in increments of 30 degrees.

Other features and advantages of the invention include a versatile mounting scheme that allows the sensor to be mounted on almost any ceiling including hard ceilings, acoustical tile ceilings, electrical boxes, and electrical conduit fittings. Moreover, the mounting permits the sensor to be installed and removed without removing the sensor mounting plate. The unique mounting also is mechanically adjustable (i.e., rotatable with tactile feedback), which allows the user to rotate the mounted sensor to direct it toward the region of interest without having to change the mounting.

Further objects, features, and advantages of this invention will become apparent from a consideration of the drawings and ensuing detailed description.

BRIEF DESCRIPTION OF THE DRAWINGS

For a more complete understanding of the invention and advantages thereof, reference is now made to the following description taken in conjunction with the accompanying drawings in with like reference numbers indicate like features and wherein.

DESCRIPTION OF ILLUSTRATIVE EMBODIMENTS

For convenience, the following definitions of frequently used acronyms are provided:

| | |
|---|---|
| IR | infrared |
| LED | light emitting diode |
| PCB | printed circuit board |
| PIR | passive infrared |

Figure 1A:
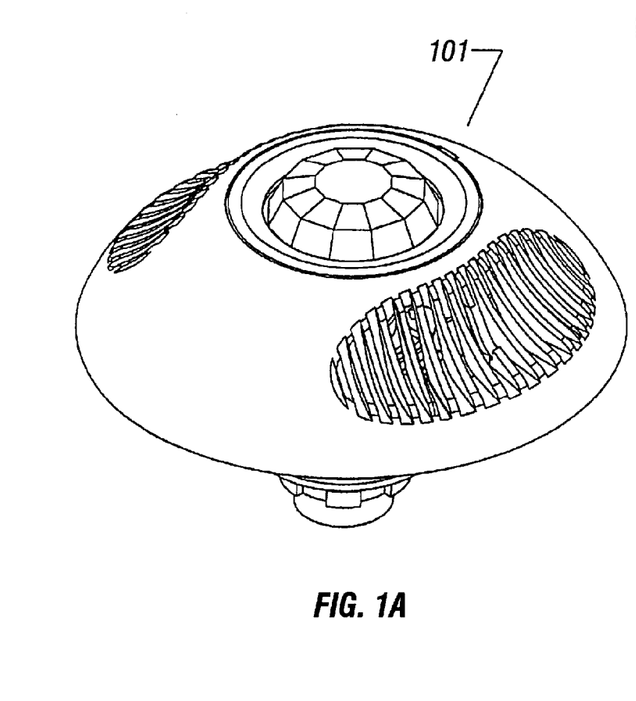
FIGS. 1A and 1B are bottom and top views of an occupancy sensor of the present invention.
Figure 1B:
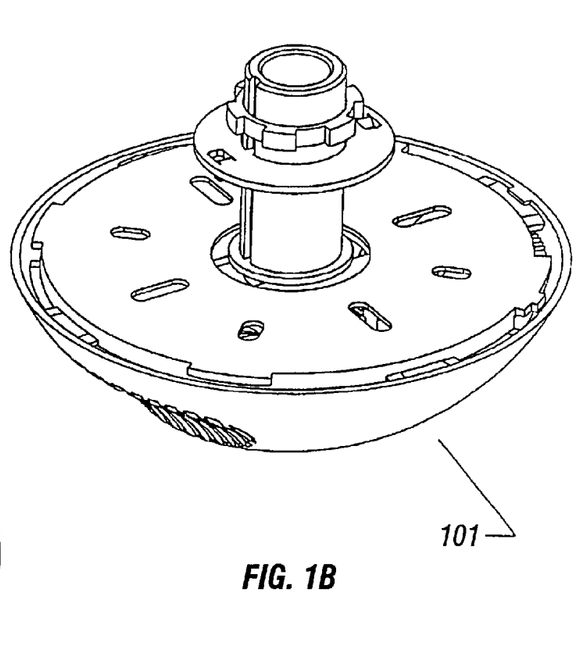

Top and bottom views of the present invention are shown in FIGS. 1A and 1B. The illustrated embodiment of the present invention includes an occupancy sensor 101 that utilizes both ultrasonic and passive infrared sensors to control one or more electrical loads in a given area. When the area controlled by the sensor is unoccupied and occupancy is sensed, the electrical load(s) controlled by the sensor are energized and the sensor's delay timer is initialized with a user-specified time delay. The sensor will wait the specified time delay and then de-energize the sensor's electrical load(s) unless occupancy is again sensed prior to that time. If occupancy is again sensed before the sensor's count down timer reaches zero, the sensor's count down timer is re-initialized to the user-specified time delay.

Figure 2:
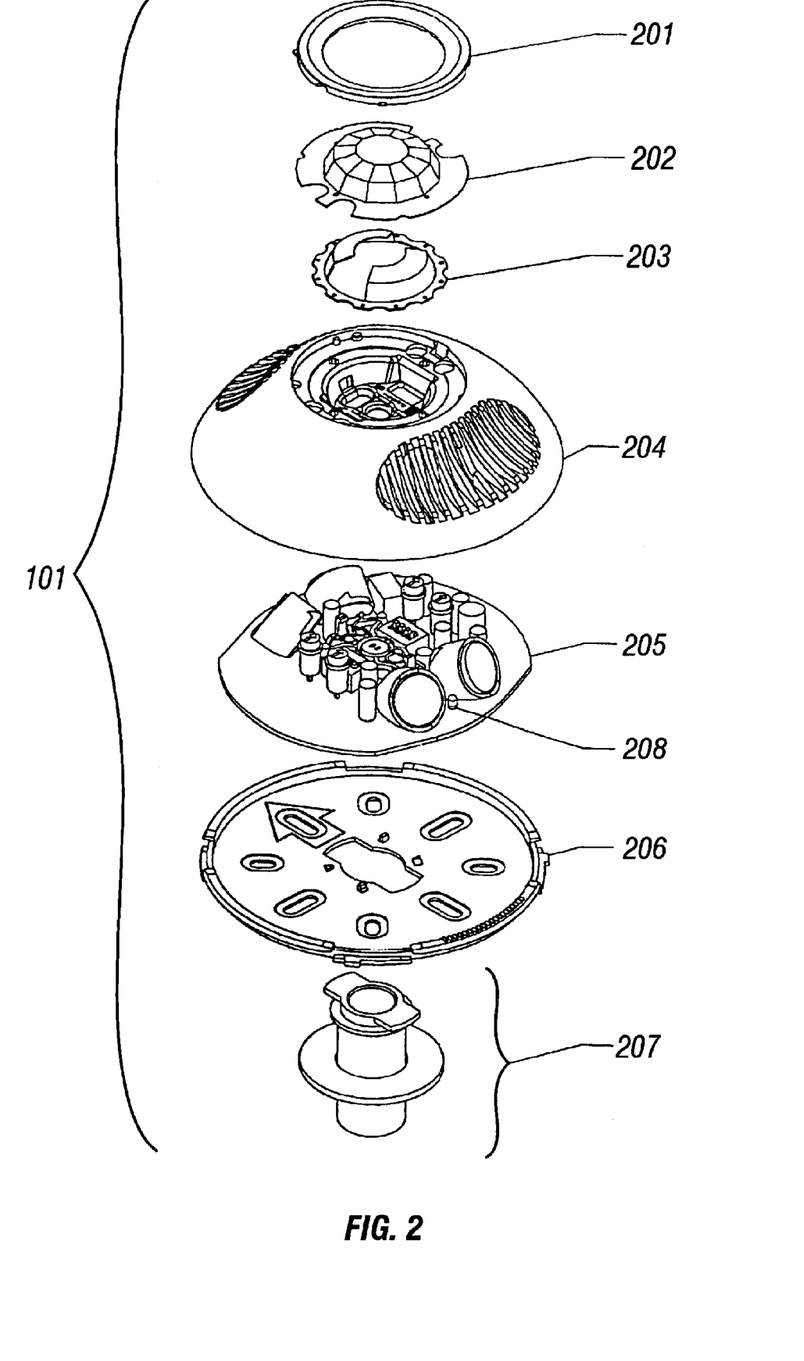
FIG. 2 is an exploded assembly drawing of the occupancy sensor of the present invention.

An exploded assembly drawing for the present invention is shown in FIG. 2. The occupancy sensor has the following primary mechanical hardware parts: PIR lens retaining ring 201, PIR lens 202, PIR mask 203, sensor case assembly 204, PCB assembly 205, sensor mounting plate 206, sensor mounting hardware 207, and LED 208.

Each of these mechanical hardware parts is now described in detail.

Figure 3A:
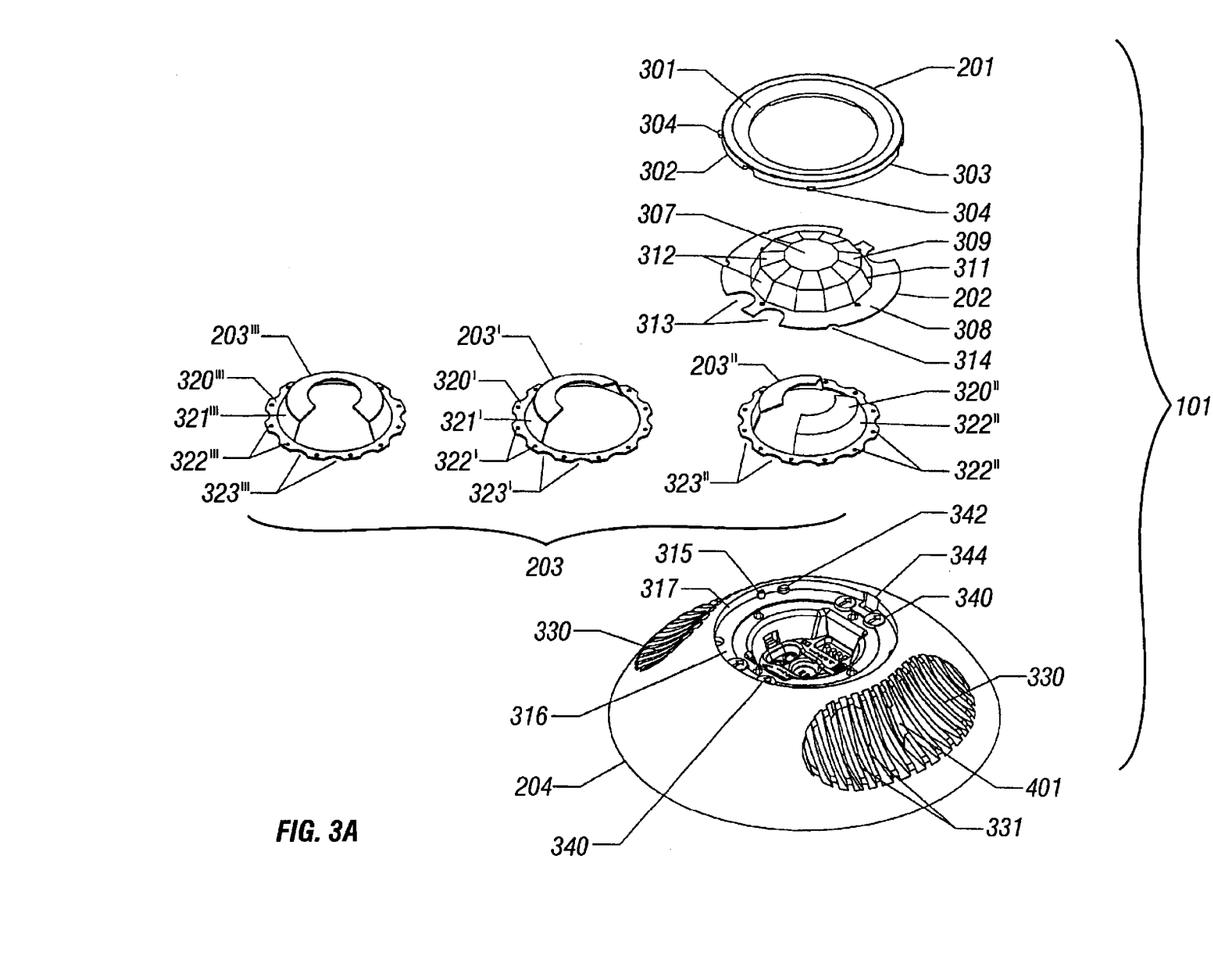
FIG. 3A illustrates a flexible PIR sensor masking insert scheme, including a top view of the PIR lens retaining ring of the present invention.
Figure 3B:
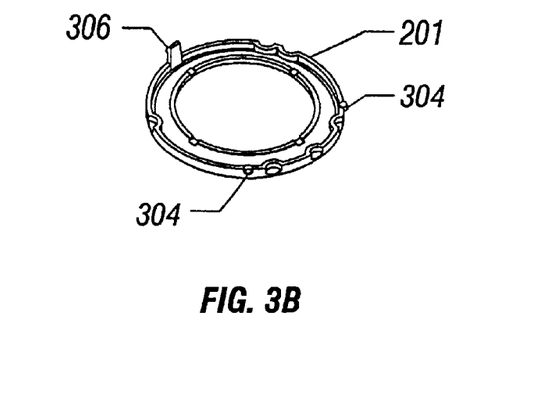
FIG. 3B is a bottom view of the PIR lens retaining ring of the present invention.

An illustrative embodiment of the PIR lens retaining ring 201 is shown in more detail in FIGS. 3A and 3B. FIG. 3A illustrates a sensor mounting scheme, including a top view of retaining ring 201. FIG. 3B is a bottom view of retaining ring 201. Retaining ring 201 holds the PIR lens 202 and PIR mask 203 in place, and may be made of any acceptable material, such as molded plastic. Retaining ring 201 is removably engaged with sensor case assembly 204 to permit adjustments and changes to be made to PIR lens 202 and PIR mask 203 during the operation of the sensor.

In order to allow full visibility of as much PIR energy as possible by PIR lens 202, the top surface 301 of retaining ring 201 is preferably beveled, and the outer portion 302 of the top surface 301 is shaped to mount flush with the sensor case assembly 204. Outer vertical edge 303 of PIR retaining ring 201 has small retaining tabs 304 and large locking tab 306 shown in FIG. 3B. The small retaining tabs 304 orient the retaining ring 201 with respect to the sensor case assembly 204 and permit sensor case assembly 204 to engage the outer vertical edge 303 of retaining ring 201 on sensor case assembly 204. The locking tab 306 locks the PIR retaining ring 201 to the sensor case assembly 204.

An exemplary embodiment of PIR lens 202 is also shown in FIG. 3A, and comprises a molded dome-shaped, semi-transparent plastic multi-faceted Fresnel lens 307, surrounded by a flat skirt 308 on its outer perimeter. The function of the PIR lens 202 is to focus infrared energy from a variety of directions onto the PIR sensor element located on PCB assembly 205.

In an exemplary embodiment, the multi-faceted Fresnel lens 307 of the PIR lens 202 has multiple tiers. For example, facet 312 includes two tiers 309, 311. Each tier of facets 312 focuses energy from different vertical angles on the PIR sensor element located on PCB assembly 205. It should be readily observable that a variety of different multi-faceted lenses may be used for PIR lens 202 to allow the spatial response of the sensor to be customized to particular applications.

The flat skirt 308 of PIR lens 202 has several large semi-circular notches 313 and several small semi-circular notches 314 cut in the outer edge of skirt 308. The large semi-circular notches 313 allow the user access to the sensor's adjustment potentiometers on PCB assembly 205. Two of the three small semi-circular notches 314 cut in the outer edge of the PIR lens allow clearance for the two small retaining tabs 304 on the outer vertical edge 303 of the PIR lens retaining ring 201. The remaining small semi-circular notch 314 cut in the outer edge of the PIR lens 202 orients the lens with respect to the sensor case 204 by mating with the small protruding semi-circular plastic tab 315 located in the recessed circular PIR sensor cavity 316 of the sensor case 204.

An exemplary embodiment of the PIR mask 203 shown in FIG. 3A is a molded, dome-shaped, semi-transparent, plastic mask surrounded by a flat skirt 320 on its outer perimeter. The function of the PIR mask is to allow the user to customize the sensor's infrared sensitivity pattern. The PIR mask 203 accomplishes this by blocking infrared radiation from certain user-specified directions and passing infrared radiation from other directions. The major features of the PIR mask are its dome 321 and its flat skirt on its outer perimeter 320.

The dome 321 of the PIR mask 203 selectively passes or blocks infrared radiation according to the user's needs. A PIR oblong pattern mask 203" passes infrared radiation in a long, narrow pattern suitable for narrow rooms and hallways. A PIR 180 degree mask 203', a PIR 270 degree mask 203'" and the PIR 360 degree mask (not shown) are of similar basic design, but have differently shaped domes and therefore differently shaped infrared sensitivity patterns. It should be readily observable that various other masks may be used without departing from the scope and spirit of the present invention.

The skirt 320 of the PIR mask 203 has a number of small circular holes 322 and small semi-circular notches 323 cut in its outer perimeter. This allows the user to easily rotate the PIR mask 203 in increments of 30 degrees to customize the sensor's infrared spatial sensitivity to the user's requirements. For any particular user-specified mask orientation, one of the small semi-circular notches 323 in the flat skirt 320 of the PIR mask 203 will mate with the small protruding semi-circular plastic tab 315 located in the recessed circular PIR sensor cavity 316 of the sensor case 204.

An exemplary embodiment of the sensor case assembly shown in FIG. 3A includes the sensor case 204 with one or two ultrasonic acoustic grills 330. The function of the sensor case assembly is to enclose the occupancy sensor's printed circuit board (PCB) assembly 205 as well as to shape the sensor's ultrasonic sensitivity pattern. The sensor case 204 is a molded, hollow, dome-shaped, opaque plastic case. The major features of the sensor case are the recessed circular PIR sensor cavity 316, the mounting plate attachment tabs 630 (FIG. 6B) and one or two ultrasonic acoustic grills 330.

The recessed circular PIR sensor cavity 316 is a small circular cavity surrounded by a narrow, flat, elevated rim 317 on its outer perimeter. The PIR sensor cavity 316 encloses the sensor's PIR sensor, PIR motion indicator(s), and two user-selectable option switch banks. The narrow, flat, elevated rim 317 which surrounds the PIR sensor cavity 316 has four large circular holes 340, three small protruding elevated semi-circular plastic tabs 342, one small protruding semi-circular plastic tab 315, and one rectangular slot 344.

The four large circular holes 340 allow user access to the four user-controlled analog potentiometers on PCB assembly 205.

The three small protruding elevated semi-circular plastic tabs 342 hold down the PIR lens 202. These three elevated tabs are uniformly spaced 120 degrees apart around the rim 317 of the recessed circular PIR sensor cavity 316. The small protruding semi-circular plastic tabs 342 mate with the small semi-circular notches 314 cut in the outer edge of the PIR lens 202 to orient the lens with respect to the sensor case 204. The large locking tab 306 on the PIR lens retaining ring 201 mates with the rectangular slot 344 in the narrow, flat, elevated rim 317 surrounding the PIR sensor cavity 316 to secure the PIR lens retaining ring 201 to the sensor case.

The ultrasonic acoustic grill 330 comprises a number of thin, vertical plastic fins 331 which are used to visibly mask the sensor's ultrasonic transducers. A one-way ultrasonic sensor has one ultrasonic grill while a two-way ultrasonic sensor has two diametrically-opposed ultrasonic grills. Each ultrasonic grill accommodates one ultrasonic transmitting transducer and one ultrasonic receiving transducer.

Figure 4:
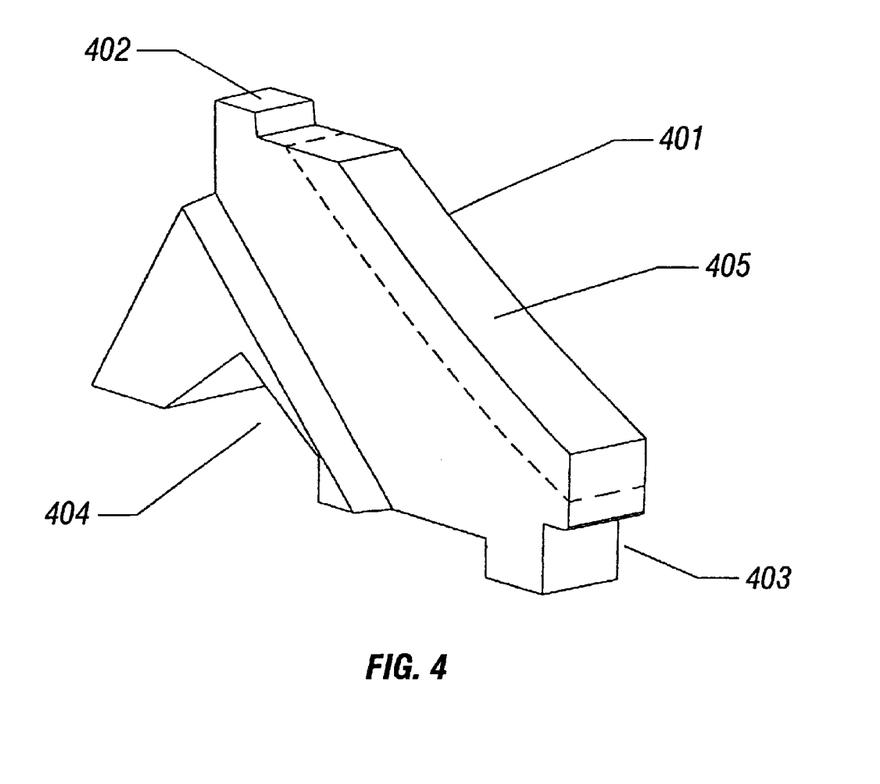
FIG. 4 is a light pipe for the present invention.

The light pipe 401, shown in FIG. 4, is a molded, clear, hard, thin, complex-shaped piece of polycarbonate plastic. The function of the light pipe 401 is to conduct light from the sensor's LED 208, which indicates the detection of motion, through the sensor case 204 to the outside of sensor case 204. The major features of the light pipe 401 are its upper rectangular tab 402, frontal rectangular tab 403, lower inverted U-shaped notch 404, and its upper curved surface 405.

The upper rectangular tab 402 of the light pipe 401 mates with a rectangular notch on the inside surface of the sensor case to orient the upper edge of the light pipe with respect to the sensor case. The frontal rectangular tab 403 of the light pipe mates with a plastic locking tab on the inside surface of the sensor case 204 to snap the light pipe into the sensor case 204. The lower inverted U-shaped notch 404 of the light pipe is located very near the ultrasonic motion indicator LED 208 on PCB assembly 205 (see also FIG. 2) and is the optical input for the green light generated by that LED. The upper curved surface 405 of the light pipe mounts flush with the outer edge of the center plastic fin in the ultrasonic acoustic grill and is the optical output for the green light generated by the ultrasonic motion LED 208.

An embodiment of the PCB assembly 205 shown in FIG. 2 includes a double-sided PCB board 205 and a PIR sensor/LED subassembly 501. The function of the PCB assembly 205 is to hold the occupancy sensor's electronics including its ultrasonic and infrared transducers and motion indicators.

The exemplary double-sided PCB board 205 is an oval-shaped, double-sided printed circuit board containing surface mount and through-hole electrical circuit components. The double-sided PCB board includes ultrasonic transducers and a digital microcontroller with a multi-channel 8-bit analog-to-digital converter.

Figure 5:
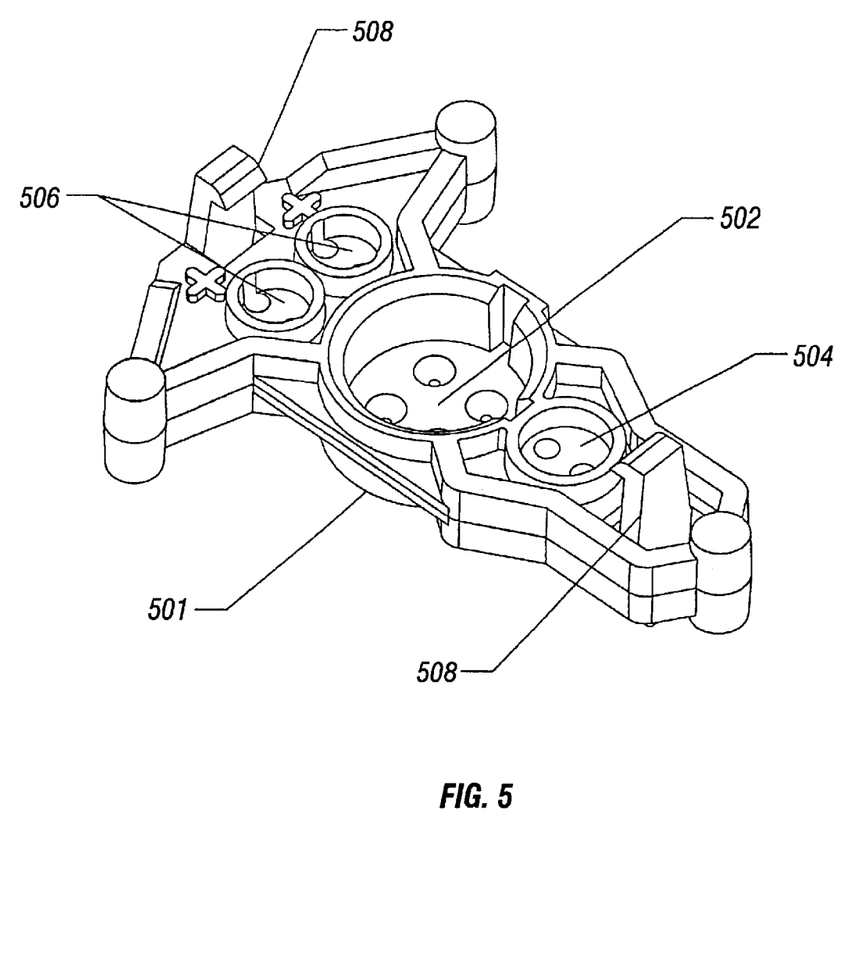
FIG. 5 is a PIR sensor/LED subassembly for the present invention.

The PIR sensor/LED subassembly 501 shown in FIG. 5 may be, for example, a small molded T-shaped plastic insert. The primary function of the PIR sensor/LED subassembly 501 is to precisely locate the position of the infrared sensor element. The major features of the PIR sensor/LED subassembly 501 are the PIR sensor holder 502, the photo cell sensor holder 504, the two infrared sensor LED holders 506, and plastic mounting clips 508.

The exemplary embodiment of PIR sensor holder 502 of the PIR sensor/LED subassembly 501 includes one small circular cavity with three lead holes. The PIR sensor holder 502 allows precise horizontal and vertical positioning of the PIR sensor with respect to the sensor case 204 and thus with respect to the PIR mask 203 and lens 202. This positioning is critical for proper operation of the infrared sensor.

The photo cell sensor holder 504 of the PIR sensor/LED subassembly 501 includes one small circular cavity with two lead holes. This feature holds the photo cell sensor if it is installed.

The two infrared sensor LED holders 506 of the PIR sensor/LED subassembly 501 include two small circular cavities each having two lead holes. These features hold the sensor's two infrared sensor LEDs.

The plastic mounting clips 508 of the PIR sensor/LED subassembly 501 are formed as two pairs of plastic mounting clips 508. The lower pair of mounting clips (not shown) secures the PIR sensor/LED subassembly 501 to the double-sided PCB 205. The upper pair of mounting clips 508 secures the PIR sensor/LED subassembly 501 to the sensor case assembly 204.

Figure 6A:
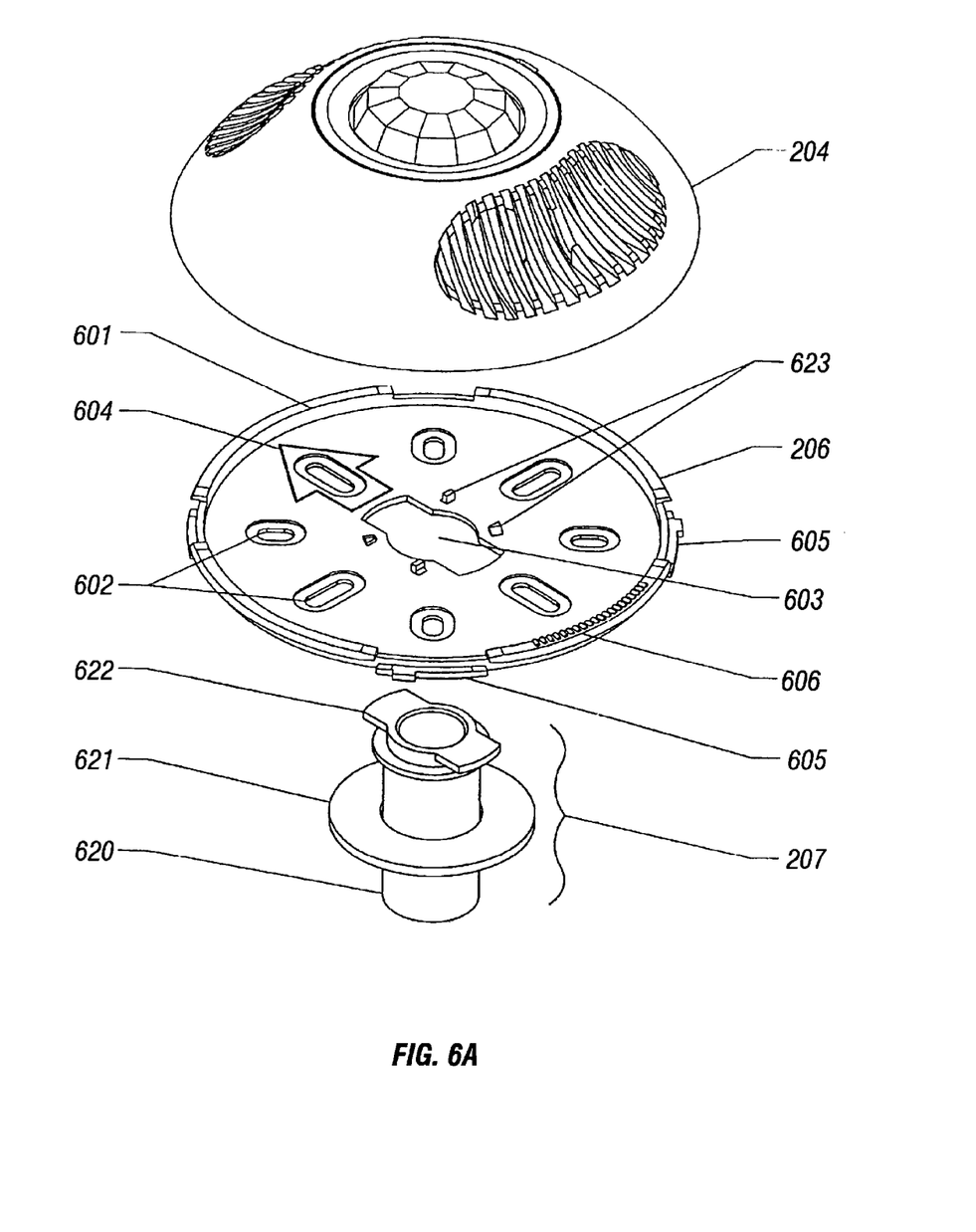
FIG. 6A is an universal mounting scheme of the present invention.

An embodiment of the sensor mounting plate 206 shown in FIG. 6A is a molded, flat, circular, opaque plastic plate having a shallow rim 601 on its perimeter. The function of the sensor mounting plate 206 is to provide a stable, adjustable mounting base for the occupancy sensor.

The mounting holes 602 in the sensor mounting plate 206 allow the sensor mounting plate to be attached to almost any type of ceiling or junction box. The eight radial oriented mounting holes 602 allow the mounting plate 206 to be attached to a conventional ceiling with screws. The large mounting hole 603 in the center of the mounting plate 206 allows the mounting plate 206 to be attached to a sensor mounting stud 620. The arrow 604 on the mounting plate points generally toward the area to be covered by the sensor.

Figure 6B:
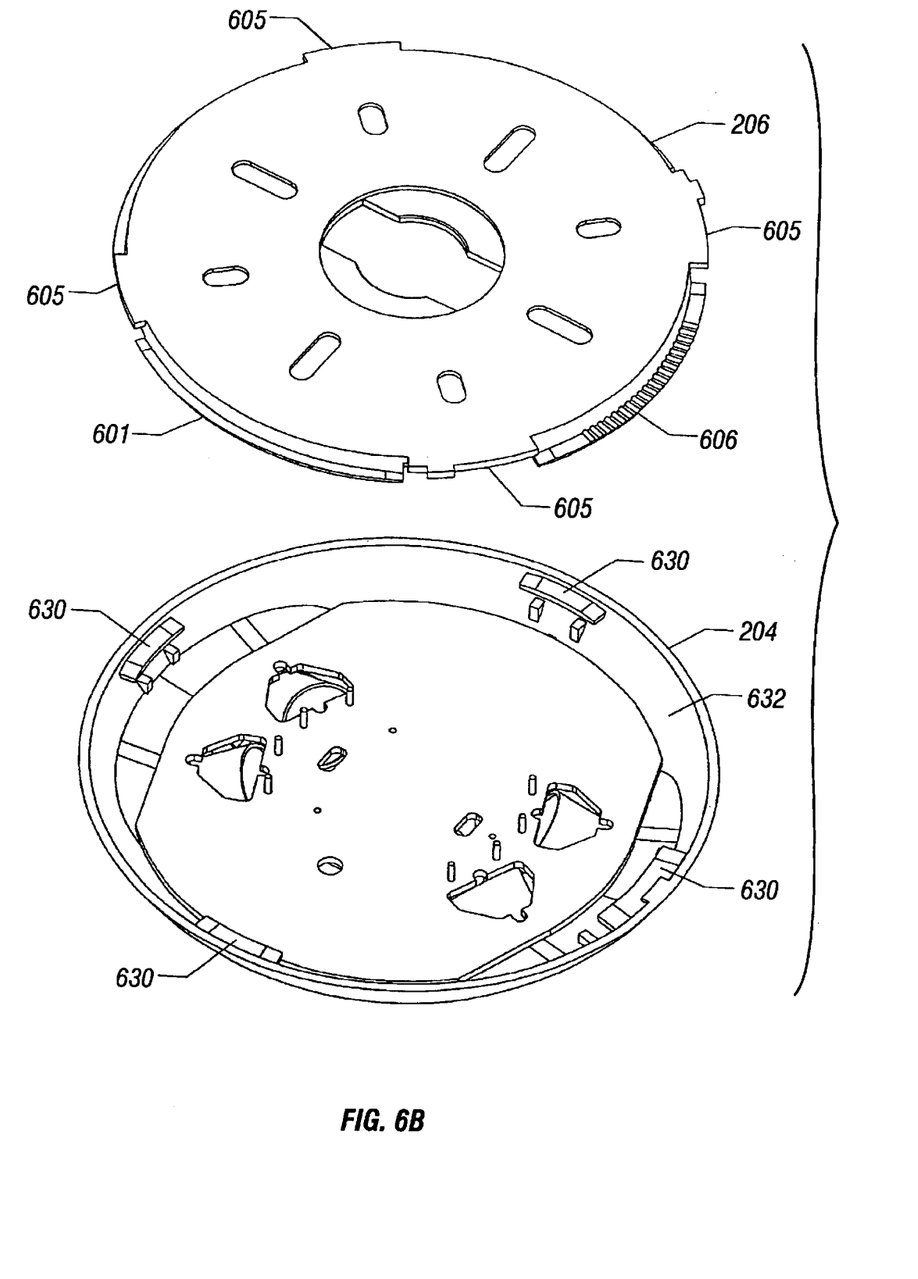
FIG. 6B is a bottom view of the sensor case assembly and sensor mounting plate of the present invention.

As illustrated in FIG. 6B, the shallow rim 601 of the sensor mounting plate 206 allows the sensor to be easily installed and removed from the sensor mounting plate 206. The mounting plate attachment tabs 630 include four horizontal plastic tabs uniformly spaced 90 degrees apart around the lower inner rim 632 of the sensor case assembly. These four tabs interlock with four mounting tabs 605, which are uniformly spaced 90 degrees apart around the shallow rim 601 of the sensor mounting plate 206 to allow simple attachment and removal of the sensor from the sensor mounting plate 206.

Once the sensor has been attached to the mounting plate 206, the mounted sensor may be rotated a small amount in either the clockwise or counterclockwise direction to make final, precise determination of the area to be covered by the sensor. The molded plastic teeth 606 in the rim 601 of the sensor mounting plate 206 provide tactile feedback to the user during final adjustment of the area to be covered by the sensor.

An embodiment of the sensor mounting hardware 207 shown in FIG. 6A consists of a sensor mounting stud 620, a sensor mounting washer 621 and an sensor mounting nut. The function of the sensor mounting hardware is to attach the sensor mounting plate to an acoustic ceiling tile or a metal junction box. Sensor mounting stud 620 is a short, hollow, cylindrical plastic pipe with a flat, T-shaped cap 622. The T-shaped cap 622 of the sensor mounting stud fits into the large central mounting hole 603 of the sensor mounting plate 206 and is held in place by the four small central plastic tabs 623 in the sensor mounting plate. A sensor mounting washer 621 is a flat, circular, plastic keyed washer used to attach a sensor mounting stud to an acoustic ceiling tile. A sensor mounting nut 702 (see FIG. 7) is a large (typically 0.5 inch) EMT nut used to secure one end of a sensor mounting stud 620 to an acoustic ceiling tile.

Figure 7:
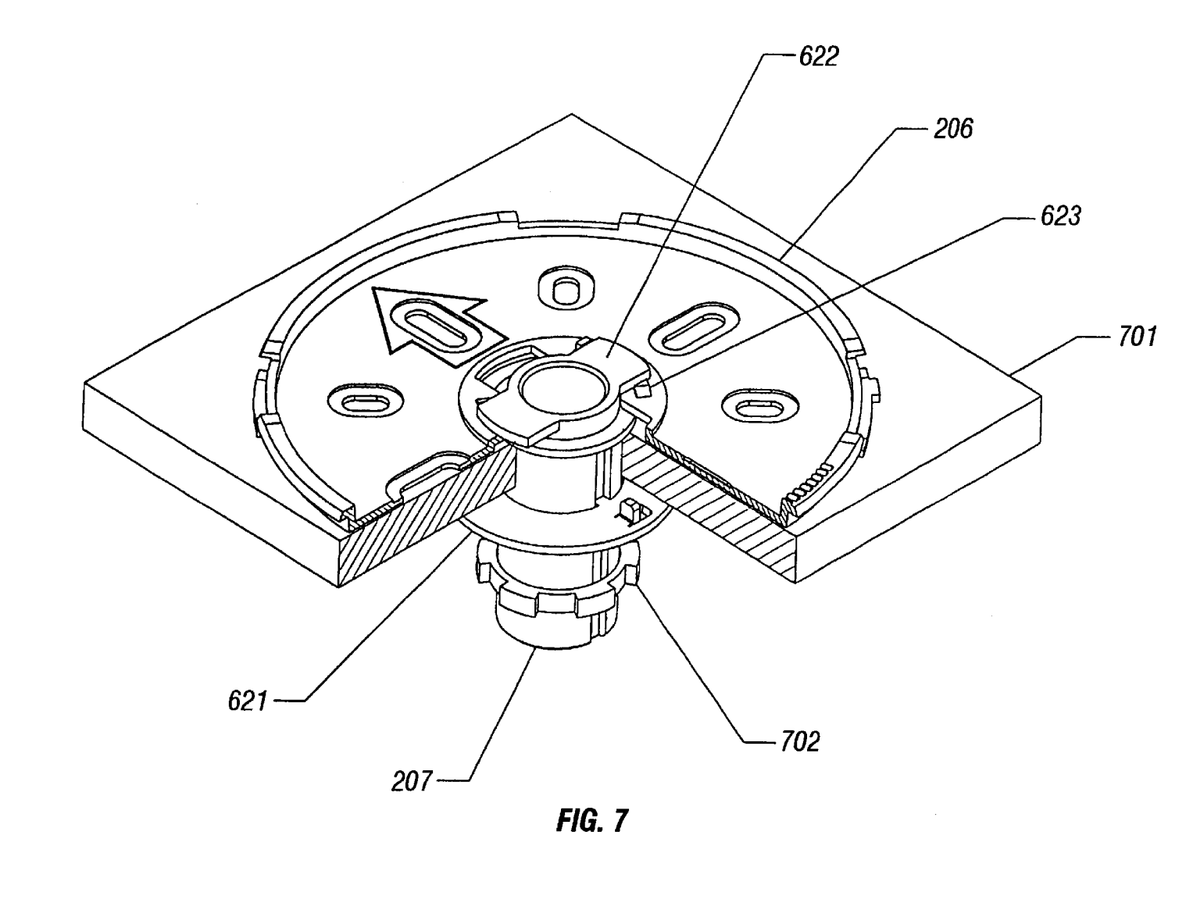
FIG. 7 illustrates the universal mounting scheme of the present invention as mounted in an acoustic ceiling tile.

An illustration of an embodiment of the sensor mounting plate 206 and sensor mounting hardware 207 attached to a ceiling is illustrated in FIG. 7. Initially, the sensor mounting stud 620 is secured to the sensor mounting plate by placing the T-shaped cap 622 of the sensor mounting stud 620 through the large mounting hole 603 in the sensor mounting plate 206 and rotating the sensor mounting stud 206 so that the T-shaped cap 622 engages the four central plastic tabs 623 in the sensor mounting plate 206. A hole is placed in the ceiling tile 701 to permit the sensor mounting hardware 207 to extend through the ceiling tile 701. Once the mounting stud 620 is placed through the ceiling tile 701, the sensor mounting plate 206 is secured to the ceiling tile 701 by a sensor mounting washer 621 and sensor mounting nut 702. Similarly, the same hardware may be used to connect the occupancy sensor to a junction box or a light ballast.

Although the description above contains many specifics, these should not be construed as limiting the scope of the invention but as merely providing illustrations of some of the presently preferred embodiments of this invention. For example, the sensor might use one or more subsets of the various detection technologies described above. Similarly, the sensor might use a different PIR lens or PIR mask than the disclosed embodiments. Therefore, it should be understood that various changes, substitutions, and alterations can be made hereto without departing from the scope and spirit of the invention as defined in the appended claims.

What is claimed is:

1. An occupancy based load controller, comprising:
   at least one occupancy sensor, including at least one passive infrared sensor;
   a passive infrared lens operable to focus infrared energy from a plurality of directions toward said passive infrared sensor;
   a passive infrared mask operable to block infrared radiation from selected directions;
   a sensor case assembly enclosing said occupancy sensors;
   a passive infrared retaining ring removably engaging said passive infrared lens and passive infrared mask to said sensor case assembly; and
   wherein said mask is operable to rotate within and relative to said sensor case assembly to adjust the spatial sensitivity of said sensor.

2. The load controller of claim 1, wherein said passive infrared lens is a multi-faceted Fresnel lens.

3. The load controller of claim 1, wherein said passive infrared mask is an oblong pattern mask operable to pass infrared radiation in a narrow pattern.

4. The load controller of claim 1, wherein said passive infrared mask is a 180 degree mask.

5. The load controller of claim 1, wherein said passive infrared mask is a 270 degree mask.

6. The load controller of claim 1, wherein said passive infrared mask is a 360 degree mask.

7. The load controller of claim 1, wherein said passive infrared mask is operable to rotate in increments of 30 degrees.

8. The load controller of claim 1, wherein said sensor case assembly further comprises one or more light pipes operable to conduct light from a LED motion indicator through said sensor case assembly.

9. An occupancy based load controller, comprising:
   at least one occupancy sensor, including at least one ultrasonic transmitter and sensor;
   a sensor case assembly enclosing said at least one occupancy sensor;
   a light-emitting motion indicator within said sensor case assembly;
   at least one light pipe within said sensor case assembly, said light pipe including a first surface coupled to said light-emitting motion indicator and a second surface coupled adjacent to an exterior of said sensor case assembly;
   said at least one light pipe operable to conduct light from said light-emitting motion indicator within said sensor to said exterior of said sensor case assembly, said first surface acting as a light input and said second surface acting as a light output.

10. The load controller of claim 9, wherein said first and second surfaces are contiguous.

11. An occupancy based load controller mountable to a surface of a structure, comprising:
    at least one occupancy sensor;
    a sensor case assembly enclosing said at least one occupancy sensor; and
    a sensor mounting plate adapted to be fastened to the surface of the structure, said sensor mounting plate being removably coupled to said sensor case assembly with one or more mounting tabs to permit removal of said sensor case assembly and said occupancy sensors from said sensor mounting plate without removing said sensor mounting plate from the surface of the structure.

12. The load controller of claim 11, further comprising:
    a sensor mounting stud; and
    fastening means adapted for securing said sensor mounting plate and said sensor mounting stud to the surface of the structure.

13. The load controller of claim 12, wherein the structure the load controller is mounted to is a ceiling.

14. The load controller of claim 12, wherein the structure the load controller is mounted to is a junction box.

15. The load controller of claim 12, wherein the structure the load controller is mounted to is a light ballast.

16. The load controller of claim 12, wherein the structure the load controller is mounted to is a wall.

17. The load controller of claim 11, wherein said sensor mounting plate permits rotation of said sensor case assembly without rotating said sensor mounting plate, said sensor mounting plate comprising:
    a generally flat plate;
    a shallow rim on a perimeter of said flat plate; and
    a plurality of teeth on said shallow rim, said teeth being operable with a plurality of teeth on said sensor case assembly to provide tactile feedback during rotation of said sensor case assembly.

18. The load controller of claim 11, wherein said sensor mounting plate comprises four mounting tabs uniformly spaced 90 degrees apart.

* * * * *